United States Patent
Chen et al.

(10) Patent No.: US 11,127,199 B2
(45) Date of Patent: Sep. 21, 2021

(54) SCENE MODEL CONSTRUCTION SYSTEM AND SCENE MODEL CONSTRUCTING METHOD

(71) Applicant: DELTA ELECTRONICS, INC., Taoyuan (TW)

(72) Inventors: Kuan-Wen Chen, Taoyuan (TW); Chia-Min Li, Taoyuan (TW); Yu-Ta Chen, Taoyuan (TW); Yi-Ting Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/718,112

(22) Filed: Dec. 17, 2019

(65) Prior Publication Data

US 2021/0012564 A1    Jan. 14, 2021

(30) Foreign Application Priority Data

Jul. 11, 2019    (CN) .......................... 201910664639.2

(51) Int. Cl.
*G06T 17/00*    (2006.01)
*G06K 9/62*    (2006.01)

(52) U.S. Cl.
CPC ............ *G06T 17/00* (2013.01); *G06K 9/6202* (2013.01); *G06K 9/6215* (2013.01); *G06K 9/6268* (2013.01)

(58) Field of Classification Search
CPC ............... G06T 17/00; G06T 17/005
(Continued)

(56) References Cited

U.S. PATENT DOCUMENTS

| 2008/0232687 A1* | 9/2008 | Petersohn | ............. G06F 16/786 382/173 |
| 2013/0129230 A1* | 5/2013 | Shotton | ................... G06T 17/00 382/218 |

(Continued)

FOREIGN PATENT DOCUMENTS

| CN | 107832681 A | 3/2018 |
| CN | 105046227 B | 7/2018 |

(Continued)

OTHER PUBLICATIONS

T. Shiratori, J. Berclaz, M. Harville, C. Shah, T. Li, Y. Matsushita, and S. Shiller, "Efficient large-scale point cloud registration using loop closures," 3DV, 2015.

(Continued)

*Primary Examiner* — Thomas J Lett
(74) *Attorney, Agent, or Firm* — CKC & Partners Co., LLC (57) ABSTRACT

A scene model constructing method includes the following steps. According to multiple position parameters in multiple scene materials, classifying the scene materials into multiple position groups. According to scene similarities between the scene materials, classifying the scene materials into multiple first similar image sub-groups and multiple second similar image sub-groups. Establishing a first similar image sub-model and a second similar image sub-model respectively according to the first similar image sub-group and the second similar image sub-group. Combining a first similar image sub-model to a first position model, and combining a second similar image sub-model to a second position model. Finally, combining the first position model and the second position model to a scene model.

20 Claims, 6 Drawing Sheets

(58) Field of Classification Search
USPC .......................................................... 345/419
See application file for complete search history.

(56) References Cited

U.S. PATENT DOCUMENTS

| | | | |
|---|---|---|---|
| 2016/0249041 A1 | 8/2016 | Beihang | |
| 2019/0042900 A1* | 2/2019 | Smith | G06K 9/00624 |
| 2020/0051328 A1* | 2/2020 | Mohan | G06T 19/006 |

FOREIGN PATENT DOCUMENTS

| | | |
|---|---|---|
| CN | 105593850 B | 4/2019 |
| CN | 104376003 B | 7/2019 |
| TW | 201643063 A | 12/2016 |
| TW | 201838413 A | 10/2018 |
| TW | 201907708 A | 2/2019 |
| TW | 201926990 A | 7/2019 |

OTHER PUBLICATIONS

R. Mur-Artal, J.M.M. Montiel, and J.D. Tardos, "ORB-SLAM: a versatile and accurate monocular SLAM system," IEEE Transactions on Robotics, 2015.
N. Snavely, S. Seitz, and R. Szeliski, "Photo tourism: Exploring photo collections in 3d," Proceedings of ACM SIGGRAPH, pp. 835-846, 2006.
N. Snavely, S. Seitz, and R. Szeliski, "Modeling the world from internet photo collections," International Journal of Computer Vision 80, pp. 189-210, 2008.
N. Snavely, S. Seitz, and R. Szeliski, "Skeletal graphs for efficient structure from motion," CVPR, 2008.
S. Agarwal, Y. Furukawa, N. Snavely, I. Simon, B. Curless, S.M. Seitz, and R. Szeliski, "Building rome in a day," Communications of the ACM, pp. 105-112, 2011.
C. Wu, "Towards linear-time incremental structure from motion," Proceedings of the International Conference on 3D Vision, pp. 127-134,2013.
P. Moulon, P. Monasse, and R. Marlet, "Global fusion of relative motions for robust, accurate and scalable structure from motion," ICCV, pp. 3248-3255, 2013.
R. Roberts, S.N. Sinha, R. Szeliski, and D. Steedly, "Structure from motion for scenes with large duplicate structures," CVPR, 2011.
C. Sweeney, T. Sattler, T. Hollerer, M. Turk, and M. Pollefeys, "Optimizing the viewing graph for structure-from-motion" ICCV, pp. 801-809 ,2015.
T. Shen, S. Zhu, T. Fang, R. Zhang, and L. Quan, "Graph-Based Consistent Matching for Structure-from-Motion," ECCV, 2016.
M. Havlena, A. Torii, and T. Pajdla, "Efficient structure from motion by graph optimization," ECCV, 2010.
B. Bhowmick, S. Patra, A. Chatterjee, V.M. Govindu, and S. Banerjee, "Divide and conquer: Efficient large-scale structure from motion using graph partitioning,"ACCV,2014.
D. Sweeney, V. Fragoso, T. Hollerer, and M. Turk, "Large Scale SfM with the Distributed Camera Model," 3DV ,2016.

* cited by examiner

SCENE MODEL CONSTRUCTION SYSTEM AND SCENE MODEL CONSTRUCTING METHOD

CROSS-REFERENCE TO RELATED APPLICATION

This application claims priority to China Application Serial Number 201910664639.2 filed Jul. 11, 2019, which is herein incorporated by reference in its entirety.

BACKGROUND

Technical Field

The present disclosure relates to a scene model construction system and scene model constructing method, in particular, a technique for classifying multiple scene materials and establishing a three-dimensional model.

Description of Related Art

Recently, there are multiple methods for constructing a three-dimensional scene model, but these methods require operation on a large amount of data, and the requirements for software and hardware are extremely high, so it is difficult to popularize the general user. In addition, when collecting a large amount of scene materials (e.g., images) to construct a three-dimensional model, there may be errors between each scene material due to different coordinate parameters, so it is difficult to combine. Therefore, there is a need for a construction technique that is more efficient and improves the accuracy of combination.

SUMMARY

One aspect of the present disclosure is a scene model constructing method, including the following steps: Classifying multiple scene materials into multiple position groups according to multiple position parameters in the multiple scene materials. The scene materials include in a first position group of the multiple position groups as multiple first group data, and the scene materials included in a second position group of the multiple position groups as multiple second group data. Classifying the multiple first group data into multiple first similar image sub-groups as multiple first sub-group data according to scene similarities between the multiple first group data. Classifying the multiple second group data into multiple second similar image sub-groups as multiple second sub-group data according to scene similarities between the multiple second group data. Establishing multiple first similar image sub-models according to the multiple first similar image sub-groups, and establishing multiple second similar image sub-models according to the multiple second similar image sub-groups. Combining the multiple first similar image sub-models to a first position model, and combining the multiple second similar image sub-models to a second position model. Combining the first position model and the second position model to a scene model.

Another aspect of the present disclosure is a scene model construction system, including multiple terminal devices and a processor. The terminal devices are configured to transmit multiple frame data. The processor is configured to receive the multiple frame data to obtain multiple scene materials. The processor is configured to classify the multiple scene materials into multiple position groups according to multiple position parameters in the multiple scene materials, then classify the multiple position groups into multiple similar image sub-groups according to scene similarities between the multiple scene materials. The processor is configured to establish multiple similar image sub-models according to the multiple similar image sub-groups, then combine the multiple first similar image sub-models to multiple position models, and combine the multiple position models to a scene model.

Accordingly, since the present disclosure utilizes "two stages" to sequentially classify the scene materials (e.g., position, similarity), the operation time can be effectively reduced. At the same time, by sequentially combining the three-dimensional model through "two stages", it is also possible to reduce the error that may occur when the model is combined.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
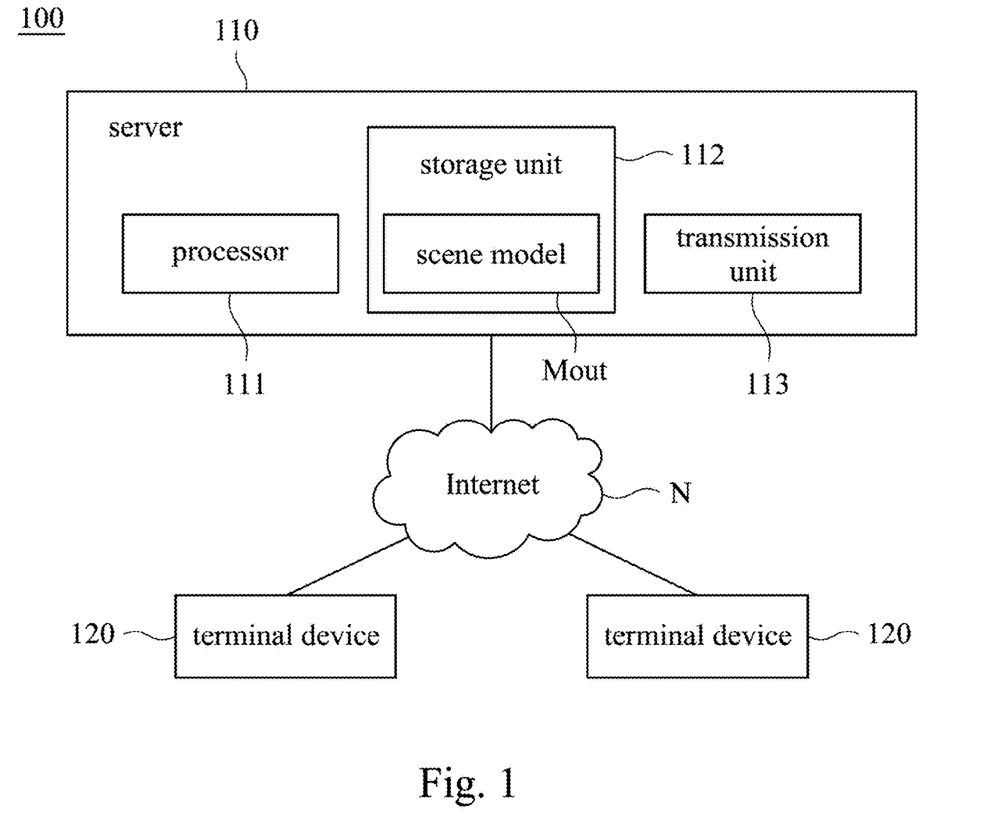
FIG. 1 is a schematic diagram of the construction system in some embodiments of the present disclosure.
Figure 2:
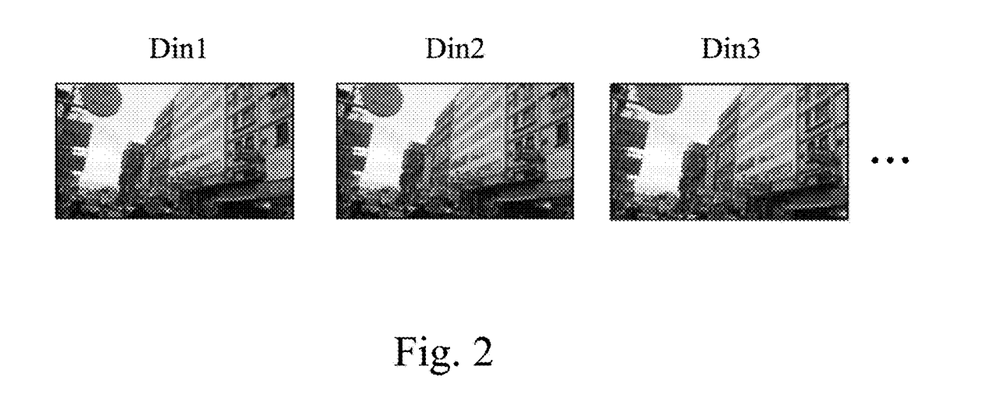
FIG. 2 is a schematic diagram of scene materials in some embodiments of the present disclosure.

Referring to FIG. 1 and FIG. 2, FIG. 1 is a schematic diagram of a construction system 100 in some embodiments of the present disclosure. FIG. 2 is a schematic diagram of the constructing method in some embodiments of the present disclosure. The construction system 100 is configured to receive multiple scene materials in order to establish a corresponding scene model.

Figure 3:
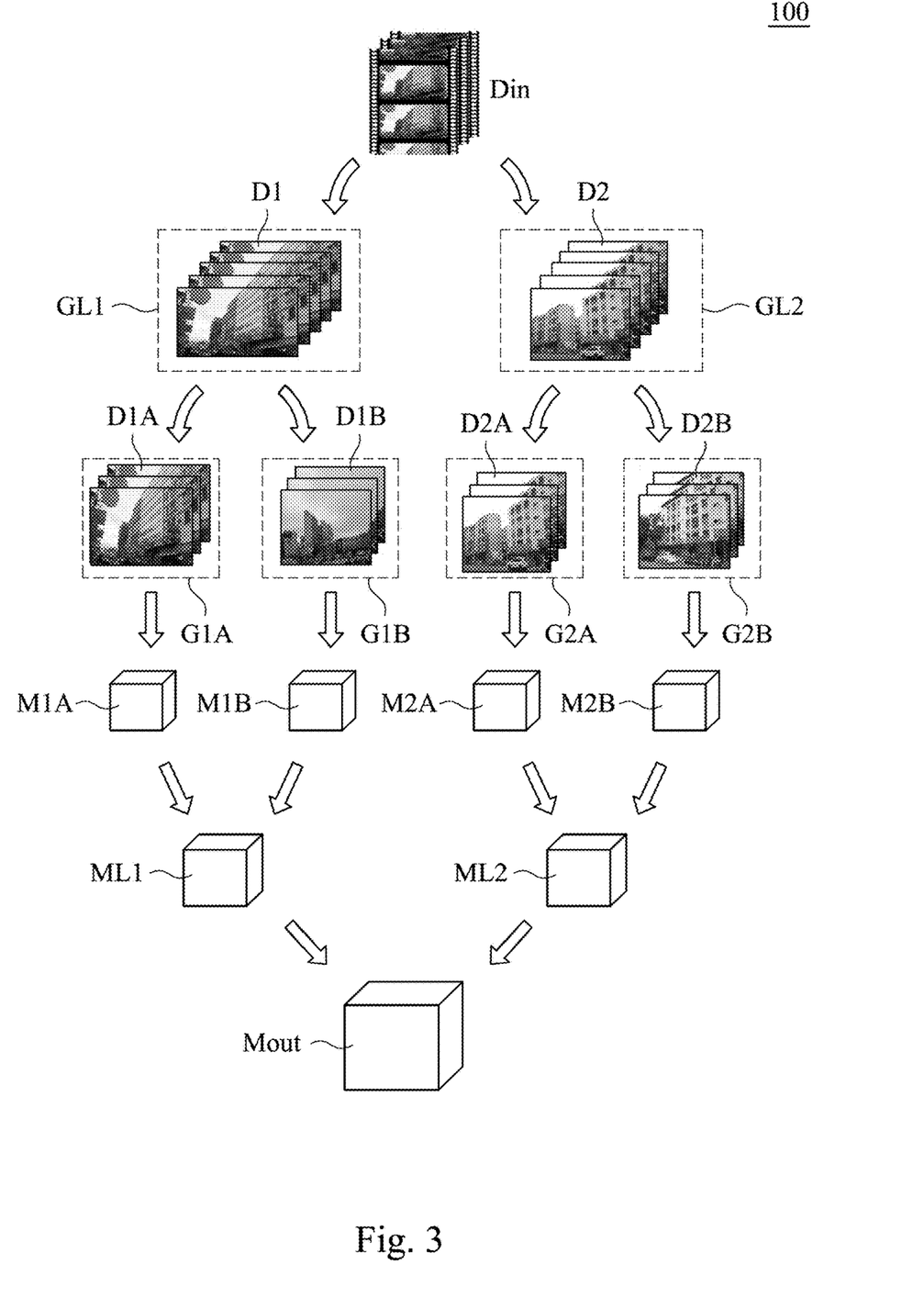
FIG. 3 is a schematic diagram of the constructing method in some embodiments of the present disclosure.

In some embodiments, the construction system 100 includes a server 110 and multiple terminal devices 120. The server 110 connects to the terminal devices 120 through Internet N. Referring to FIG. 3, the terminal devices 120 may be implemented in or implemented by a smart phone, a network device, a personal computer or devices with network connection capability. The terminal devices 120 is configured to upload multiple frame data Din1, Din2 and Din3 to Internet N, and transmit frame data Din1, Din2 and Din3 to the server 110 through Internet. The frame data Din1, Din2 and Din3 can be different images, or be a film including multiple images.

The server 110 includes a processor 111 configured to receive frame data Din1, Din2 and Din3 from the terminal device 120, and obtain multiple scene materials Din from the frame data Din1, Din2 and Din3. Referring to FIG. 2, in some embodiments, after the processor 111 of the server 110 receives the frame data Din1, Din2 and Din3, the processor 111 compares two adjacent frame data in the frame data Din1, Din2 and Din3 in order to generate multiple change values (e.g., the change value between Din1 and Din2, or the change value between Din2 and Din3). The processor 111 of the server 110 generates scene materials according to the change values. For example, the difference between the frame data Din1, Din2 extremely small, the difference between of the frame data Din2, Din3 is obvious. When the processor 111 of the server 110 determines that the change value (difference) is larger than a threshold value, the processor 111 will reserve the frame data Din2 and Din3 as scene materials Din. Because the frame data Din1 is similar with the frame data Din2, so the frame data Din1 can be removed. Accordingly, the present disclosure can reduce the operation load of the server 110 during constructing model.

Each of the scene materials Din includes a position parameter. The position parameter can be a coordinate according to Global Positioning System, or can be a latitude and longitude. The position parameter is configured to represent the location corresponding to the display content of the scene materials Din. The processor 111 of the server 110 classifies the scene materials Din into multiple position groups G1, G2 according to position parameters (this step is also known as Location Clustering), then classifies position groups G1, G2 into multiple similar image sub-groups G1A, G1B, G2A and G2B according to the scene similarities between scene materials Din. The processor 111 of the server 110 is further configured to establish multiple similar image sub-models M1A, M1B, M2A and M2B according to the similar image sub-groups G1A, G1B, G2A and G2B. Then, combining the similar image sub-models M1A, M1B, M2A and M2B to multiple position models ML1, ML2. Finally, the processor 111 of the server 110 can combine the position models ML1, ML2 to a scene model Mout.

As shown in FIG. 2, the server 110 first performs a first grouping of the scene materials Din according to the position parameters. Then, performing a second grouping according to the similarities between the clustered scene materials Din. Through the above technical of "two stages", the scene materials Din may be classified into multiple image sub-groups in sequence, data may be integrated more accurately and efficiently, and operation time may be reduced. At the same time, during combining the three-dimensional model, it similarly using the technical of "two stages". It means, the small similar image sub-models are combined first, then the medium position models is combined. Finally, the scene model Mout is combined. Accordingly, the constructing method of the scene model Mout can more efficiently, and the operation load can be reduced.

In addition, the above the constructing method not only improves the operation, but also user can shoot any scene by terminal device 120 as a scene material Din and upload to the server 110, so that a normal user can construct scene model Mout by the server 110 through Internet N.

To illustrate the implementation details of the present disclosure, as shown in FIG. 2, In some embodiments, the scene materials Din included in the first position group GL1 of the position groups as multiple first group data D1. The scene materials Din included in the second position group GL2 of the position groups as multiple second group data D2. In addition, the similar image sub-groups include multiple first similar image sub-groups G1A, G1B and multiple second similar image sub-groups G2A, G2B. The first similar image sub-group G1A, G1B are configured to establish the first similar image sub-models M1A, M1B. The second similar image sub-group G2A, G2B are configured to establish the second similar image sub-models M2A, M2B. The position models include a first position model ML1 and a second position model ML2.

As mentioned above, the processor 111 of the server 110 classifies the first group data D1 into the first similar image sub-group G1A, G2B as first sub-group data D1A, D1B according to multiple scene similarities between first group data D1. Similarly, the processor 111 is further configured to classifies the second group data D2 into the second similar image sub-group G2A, G2B as the second sub-group data D2A, D2B according to the scene similarities between second position group data D2. The first sub-group data D1A, D1B and the second sub-group data D2A, D2B are same as the scene material Din, all of them are frame data, but are classified in different groups. In order to clearly illustrate each step of the present disclosure, it is referred to herein by different terms.

Figure 4:
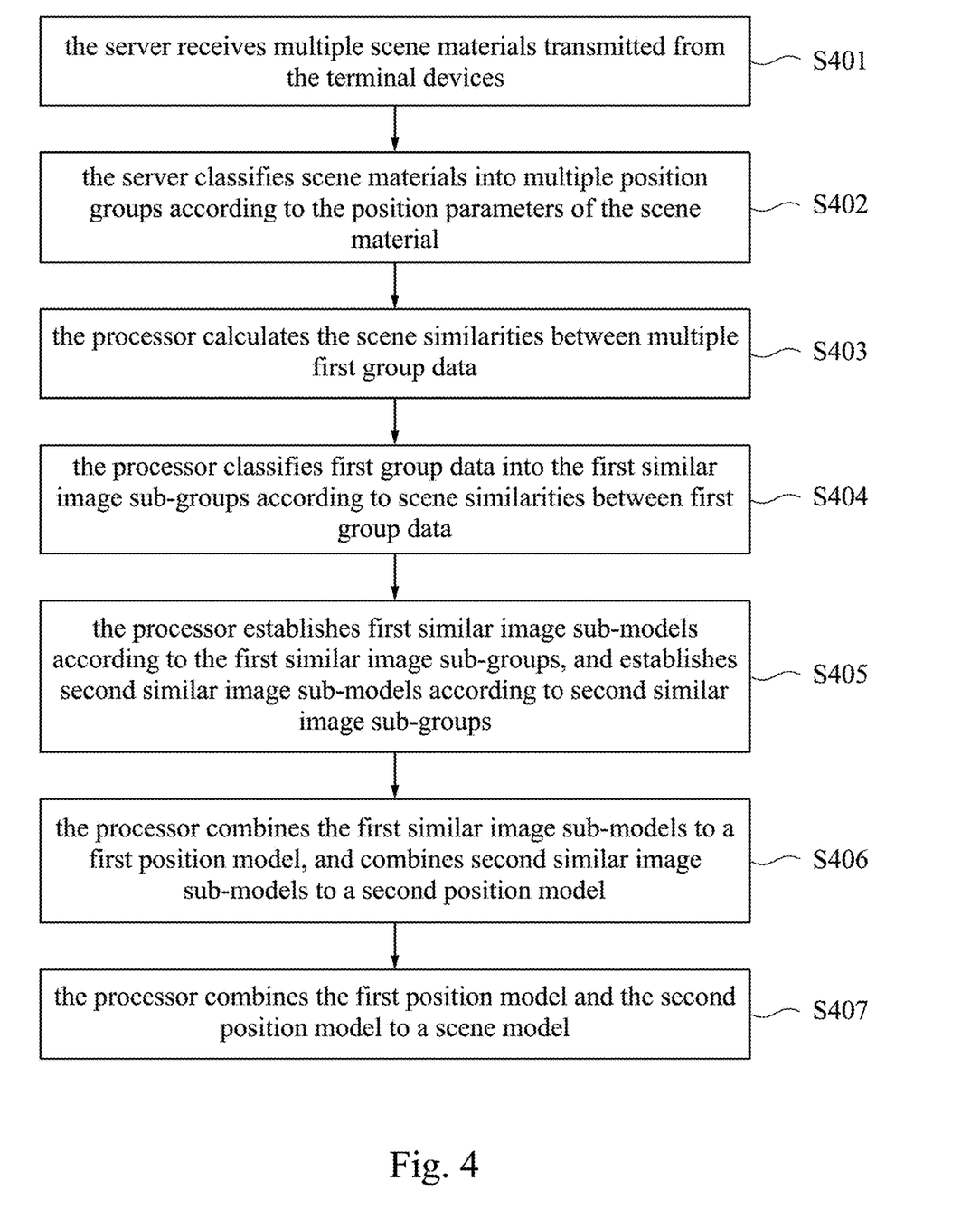
FIG. 4 is a flow chart of the constructing method in some embodiments of the present disclosure.

Referring to FIG. 4, FIG. 4 is a flow chart of the constructing method in some embodiments of the present disclosure. The steps of the constructing method of the present disclosure are described below. In the step S401, the server 110 receives multiple scene materials Din transmitted from the terminal devices 120. In some embodiments, the scene materials Din are transmitted by the different terminal device 120 to the server 110 at different time.

In step S402, the server 110 classifies scene materials Din into multiple position groups according to the position parameters of the scene material Din. As shown in FIG. 1, in some embodiments, the server 110 includes the processor 111, a storage unit 112 and a transmission unit 113. The storage unit 112 is configured to store multiple region data. each of the region data is configured to represent a position parameter of a default region (e.g., "block A", or GPS coordinates). Each of the region data corresponds to a position group. After the transmission unit 113 transmits the received scene materials Din to the processor 111, the processor 111 compares the position parameters of the scene materials Din with the position parameters of the region data in order to classify the scene materials Din into the corresponding position groups. As shown in the embodiments of FIG. 3, the position groups include a first position group GL1 and a second position group GL2, but the number of the position groups can be modified in some embodiments. As mentioned above, the scene materials Din in the first position group GL1 are taken as first group data D1. The scene materials Din in the second position group GL2 are taken as second group data D2.

In the step S403, the processor 111 calculates the scene similarities between multiple first group data D1. For example, if both of the screens of two first group data D1 are configured to represent "school", and there are 70% portion of the screen is the same, then the scene similarity is 70%. The calculation of the scene similarities will be explained in the following paragraphs.

In the step S404, the processor 111 classifies first group data D1 into the first similar image sub-groups G1A, G1B according to scene similarities between first group data D1, and as the first sub-group data D1A, D1B. For example, the first similar image sub-group G1A represents "front door of school", the first similar image sub-group G1B represents "fence of school". In some embodiments, the processor 111 classifies the first group data D1, whose scene similarities is larger than the threshold value (e.g., 70%) into the same similar image sub-group. Similarly, the processor 111 is further classifies the second group data D2 into the second similar image sub-groups G2A, G2B according to scene similarities of the second group data D2, and as the second sub-group data D2A, D2B.

In the step S405, after classifying the first similar image sub-groups G1A, G1B and the second similar image sub-groups G2A, G2B, the processor 111 establishes first similar image sub-models M1A, M1B according to the first similar image sub-groups G1A, G1B, and establishes second similar image sub-models M2A, M2B according to second similar image sub-groups G2A, G2B.

In the step S406, the processor 111 combines the first similar image sub-models M1A, M1B to a first position model ML1, and combines second similar image sub-models M2A, M2B to a second position model ML2. Finally, in the step S407, the processor 111 combines the first position model ML1 and the second position model ML2 to a scene model Mout.

In some embodiments, the server 110 stores the generated scene model Mout to the storage unit 112, so as to provide internet service (e.g., construct map image or virtual image engine). The scene model Mout may be a three-dimensional map information, when the terminal device 120 transmits a location request message to the server 110, the server 110 compares a current frame data in the location request message (e.g., an image captured by the terminal device 12) with the scene model Mout so as to obtain a spatial coordinate information. For example, determining the current frame data corresponds to the position groups G1 or the position groups G2, then obtaining the position parameter according to the compared scene material. The server 110 transmits coordinates information to the terminal device 120. Accordingly, user can quickly and accurately use the scene model Mout in the server 110 to determine the current location. In addition, the terminal device 120 can periodically transmit a location request message to the server 110, so that the server 110 can track the movement track of the terminal device 120 to implement the location tracking service.

In other embodiments, when the terminal device 120 transmits a browse request message (e.g., request to browse online maps, or request to launch online virtual image engine) to the server 110, the processor 111 may transmit a three-dimensional image data generated by the scene model Mout to the terminal device 120 according to the browse request message in order to provide the internet service.

In some embodiments, the processor 111 uses an optical flow method to calculate the change value between two adjacent frame data of multiple frame data Din1, Din2 and Din3 (e.g., prune image frames). The processor 111 selects the frame data Din1, Din2, Din3, whose change value is larger than the threshold value, as scene material Din (or called "Key frame"). Similarly, the processor 111 can also use optical flow method to calculate the scene similarities between multiple first group data D1 or between multiple second group data D2.

Figure 5:
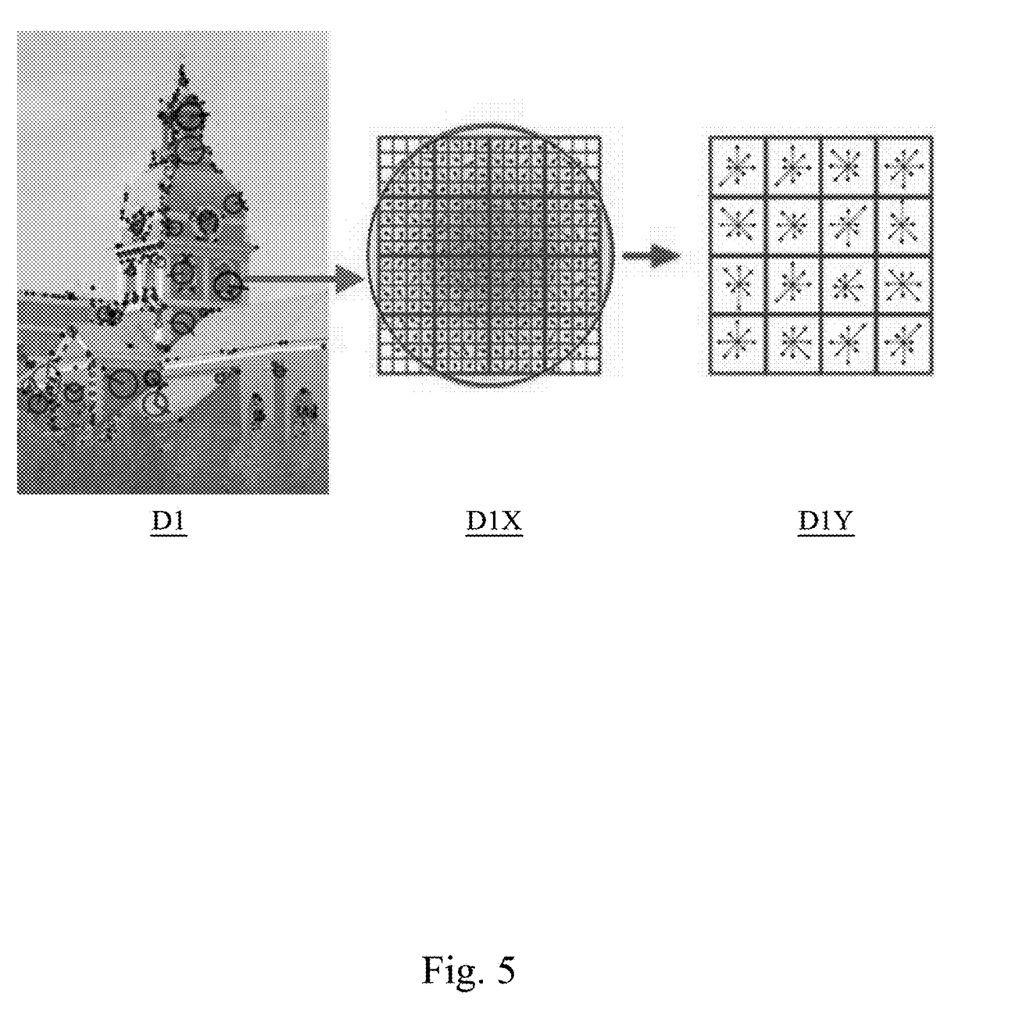
FIG. 5 is a schematic diagram of the feature vectors in some embodiments of the present disclosure.

In addition, the processor 111 can use feature vectors to calculate the scene similarities. Take the first group data D1 of the first position group GL1 as an example, the processor 111 respectively obtain feature points in each of the first group data D1. Those feature points correspond to multiple feature vectors. Referring to FIG. 5, the processor 111 may respectively obtain multiple portion areas as feature points from first group data D1 through feature information algorithm (e.g., SURF, SIFT, ORB), in order to generate feature points data D1X. Then, analyzing each of the feature points to feature vectors (e.g., a collection containing values of 64 or 128 dimensions) so as to obtain the feature vector data D1Y. Feature vector can be considered a key feature of each first group data D1, so the processor 111 may obtain scene similarities between multiple first group data by comparing feature points or feature vectors of the first group data.

The following describes the method to combine the similar image sub-models into the position models. Take the first similar image sub-model M1A, M1B as an example, the processor 111 determines the first similar image sub-groups G1A, G1B corresponding to the first similar image sub-models M1A, M1B. Then, finding similar parts from the first similar image sub-groups G1A, G1B, and as connection points to combine the first similar image sub-models M1A, M1B. Specifically, in some embodiments, during the processor 111 combines the first similar image sub-model M1A, M1B, the processor 111 first compares the corresponding first sub-group data D1A, D1B to determine multiple feature similarities between the first sub-group data D1A and the first sub-group data D1B. The first sub-group data D1A, D1B, whose feature similarity is larger than a default value, is taken as a connection portion between the first sub-group data D1A and the first sub-group data D1B (e.g., the first sub-group data D1A and the first sub-group data D1B has the same image "fence of school"). The processor 111 sets the first sub-group data D1A, D1B, whose feature similarity is larger than the default value, as "two-dimensional connected component". Through two-dimensional connected component, the first similar image sub-models M1A, M1B can be combined to the first position model ML1. Similarly, the processor 111 can combine the second similar sub-models M2A, M2B to the second position model ML2 in the same way.

Figure 6:
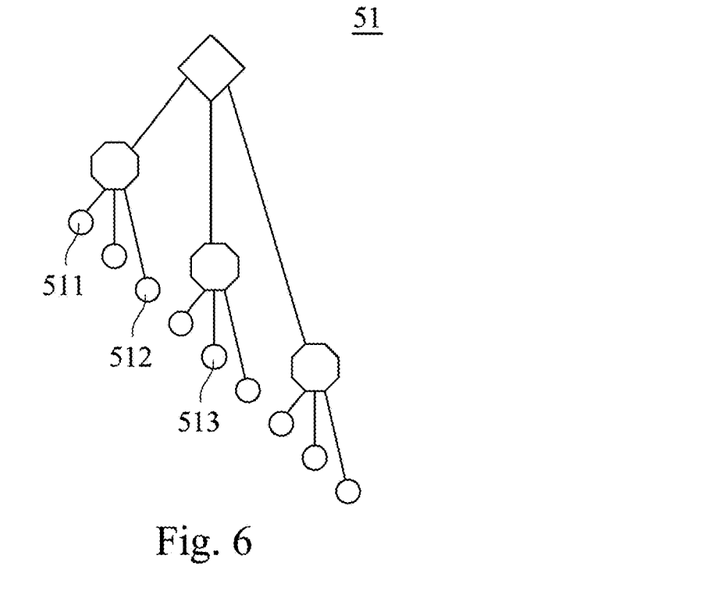
FIG. 6 is a schematic diagram of the vocabulary tree in some embodiments of the present disclosure.

Referring to FIG. 3, in some embodiments, after the processor 111 calculates the scene similarities between the first group data D1, the processor 111 further arranges the first group data D1, according to scene similarities between first group data D1 to establish a vocabulary tree according to all of the classified first sub-group data D1A of the first similar image sub-group G1A (i.e., every similar image sub-group can establish a vocabulary tree). As shown in FIG. 6, FIG. 6 is a schematic diagram of vocabulary tree 51 in some embodiments of the present disclosure. In the vocabulary tree 51, the more similar the first sub-group data D1 will be arranged the closer, and each first sub-group data D1A is used as a two-dimensional structure node 511-513 in the vocabulary tree 51. For example, the two-dimensional structure nodes 511, 512 are closer, which means that their corresponding first sub-group data D1 has higher similarity. Similarly, all of the first sub-group data D1B classified into first similar image sub-group G1B can be established as another vocabulary tree. The vocabulary tree is used to index each of the first sub-group data D1A, D1B in the first similar image sub-groups G1A, G1B.

Figure 7:
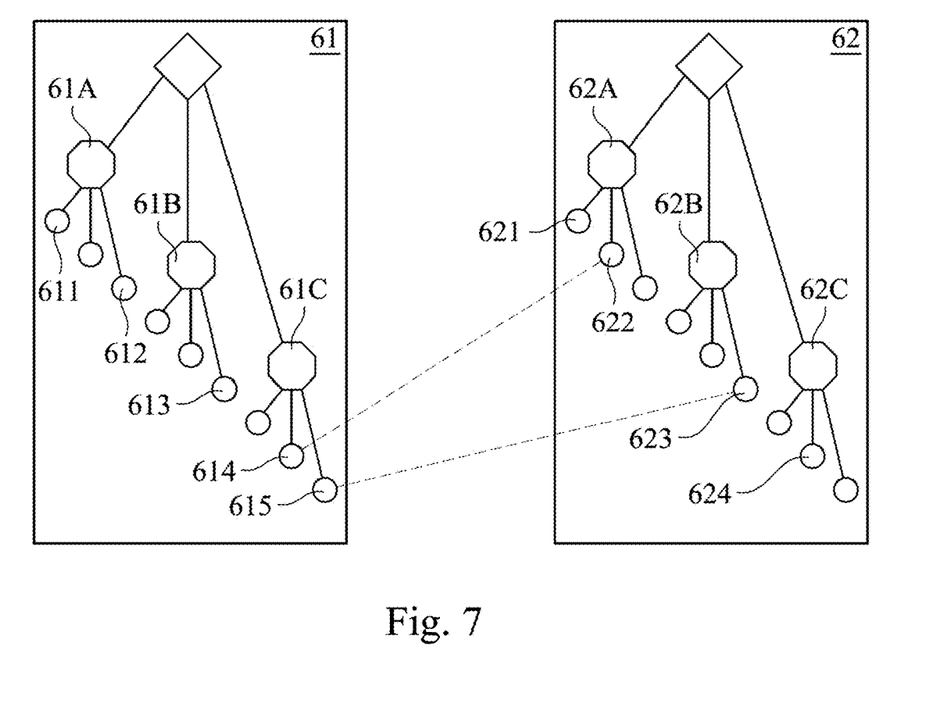
FIG. 7 is a relative relationship diagram of the vocabulary tree in some embodiments of the present disclosure.

As mention above, the processor 111 can use the vocabulary tree to find connection points between the first similar image sub-group G1A and the first similar image sub-group G1B to combine the first similar sub-models M1A, M1B. Referring to FIG. 7, FIG. 7 is a schematic diagram of vocabulary tree 61, 62 in some embodiments of the present disclosure. The vocabulary tree 61 corresponds to the first similar image sub-group G1A, and the vocabulary tree 62 corresponds to the first similar image sub-group G1B. The vocabulary tree 61 includes multiple two-dimensional structure nodes 61A~61C and 611~615. The vocabulary tree 62 also includes multiple two-dimensional structure nodes 62A~62C and 621~624. As mentioned above, each two-dimensional structure nodes corresponds to the first sub-group data D1A, D1B shown in FIG. 3. When the first similar image sub-model M1A, M1B is established, the processor 111 compares all of the two-dimensional structure nodes of different vocabulary trees 61, 62 to obtain feature similarities between of the two-dimensional structure nodes. For example, the processor 111 determines feature similarities between all of the two-dimensional structure nodes 611 in the vocabulary tree 61, all of two-dimensional structure nodes 62A~62C and 621~624 of the vocabulary tree 62. If the feature similarities is greater than the default value (e.g., 80%), the two-dimensional structure nodes can be considered the same and can be set to "the two-dimensional connected components". As shown in FIG. 6, Feature similarities between two-dimensional structure nodes 614, 622 is larger than the default value, the processor 111 may set two-dimensional structure nodes 614, 622 as the two-dimensional connected components for combining the first similar sub-model M1A, M1B.

As shown in FIG. 7, After the processor 111 compares all the two-dimensional connected components, if the processor 111 finds that the similarity between the two-dimensional structure nodes 614, 622 is the highest, and the similarity is greater than the default value "80%", the processor 111 will set the two-dimensional structure nodes 614, 622 to the two-dimensional connected components. After finding the two-dimensional connected components in the vocabulary tree 61, 62, it can confirm the same three-dimensional block between the first similar image sub-models M1A, M2A (e.g., a specific coordinate position) according to the two-dimensional connection points, so that first similar image sub-models M1A, M2A can be combined into the first position model ML1.

In the foregoing embodiment, the processor 111 calculates the feature similarities by comparing the all of two-dimensional structure nodes in the vocabulary trees 61, 62. In some embodiments, the processor 111 may only compare the feature similarities between the two-dimensional structure nodes at a last leaf node level of the vocabulary tree 61, 62 (or called "leaf"). That is, the processor 111 does not need to compare the similarity between the two-dimensional structure nodes 61A-61C and 62A-62C and other two-dimensional structure nodes. Since two-dimensional structure nodes at a last leaf node level of vocabulary trees 61, 62 represent an edge level of the first similar image sub-model M1A, this method will reduce the amount of operation of the processor 111.

Figure 8A:
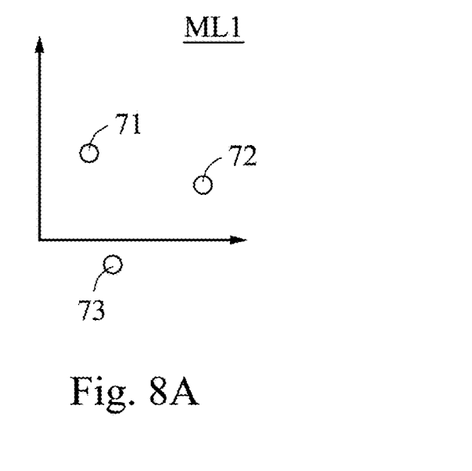
FIG. 8A-8B are point cloud schematic diagrams of the position model in some embodiments of the present disclosure.
Figure 8B:
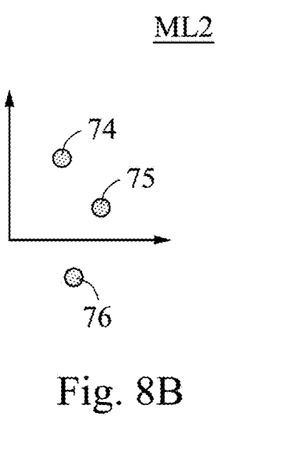

In some embodiments, first similar image sub-models M1A, M1B, second similar image sub-models M2A, M2B, the first position model ML1 and the second position model ML2 are three-dimensional models composed of multiple coordinate points, also known as "point cloud". The processor 111 can establish a point cloud model through the Structure from Motion algorithm according to sub-group data D1A, D1B, D2A, D2B of the similar image sub-groups G1A, G1B, G2A, G2B. That is, similar image sub-models M1A, M1B, M2A, M2B. In the point cloud model, each coordinate point can be regarded as a three-dimensional structure node. Referring to FIG. 8A and FIG. 8B, FIG. 8A and FIG. 8B are schematic diagrams of "point cloud" of the first position model ML1, the second position model ML2. The first position model ML1 includes multiple first three-dimensional structure nodes 71-73. The second position model ML2 includes multiple second three-dimensional structure nodes 74-76.

In some embodiments, during the processor combining the first position model ML1 and the second position model ML2, the processor first obtain multiple first three-dimensional structure nodes 71~73 and multiple second three-dimensional structure nodes 74~76 in the first position model ML1 and the second position model ML2. Then, comparing first three-dimensional structure nodes 71~73 with the three-dimensional structure nodes 74~76 to obtain the first spatial similarities between the first three-dimensional structure nodes 71~73 and the second three-dimensional structure nodes 74~76. For example, the processor 111 determines the spatial similarity between first three-dimensional structure nodes 71 and second three-dimensional structure nodes 73. If the first spatial similarity is larger than the default value (e.g., 85%), setting the first three-dimensional structure node 71 and the second three-dimensional structure node 73 as a three-dimensional connection point. After obtain the three-dimensional connection points between the first position model ML1 and the second position model ML2, the processor 111 combines the first position model ML and the second position model ML2 to a scene model Mout.

In some embodiments, during the processor 111 combines the first position model ML1 and the second position model ML2, the processor can only select three-dimensional structure nodes at an edge level of first position model ML1 and the second position model ML2 to comparison because the combine region between of the first position model ML1 and the second position model ML2 is usually the peripheral area. That is, the first three-dimensional structure nodes compared by the processor are located at an edge level of the first position model ML1, and the second three-dimensional structure nodes are located at an edge level of the second position model ML2.

In addition, when the processor combines the first position model ML1 and the second position model ML2 according to three-dimensional connection points, since all of the distance, proportion and direction between the first position model ML1 and the second position model ML2 may be differences, even if the first position model ML1, second position model ML2 is combined with the corresponding three-dimensional connection points, the combined three-dimensional model may possibly have errors. Therefore, in some embodiments, the processor 111 can modify the scene model Mout according to similar image sub-models.

Figure 9A:
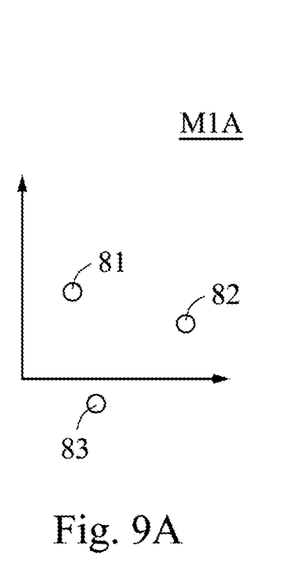
FIG. 9A-9C are point cloud schematic diagrams of the similar image sub-model in some embodiments of the present disclosure.
Figure 9B:
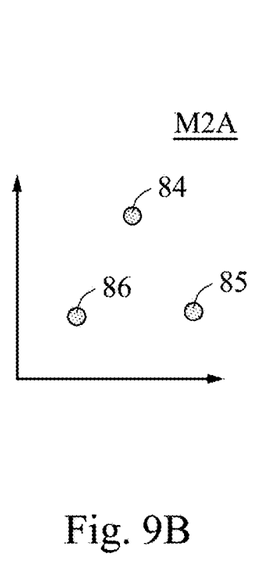
Figure 9C:
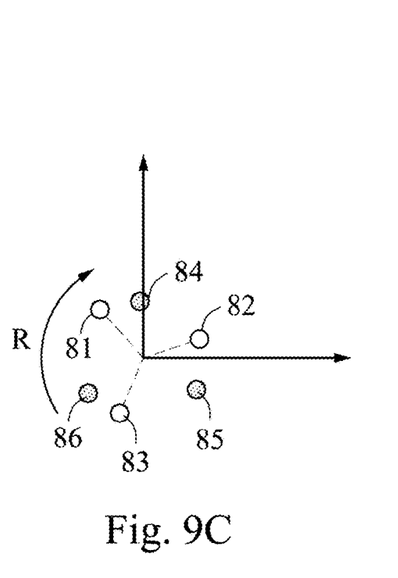

Referring to FIGS. 9A-9C, FIGS. 9A-9C are schematic diagrams of first similar image sub-model M1A and second similar image sub-model M2A. The first similar image sub-model M1A includes multiple three-dimensional structure nodes 81-83, the second similar image sub-model M2A also includes multiple three-dimensional structure nodes 84-86.

During the processor 111 combines first similar image sub-models M1A, M1B to the first position model ML1, and combines second similar image sub-models M2A, M2B to the second position model ML2, and combines the first position model ML1 and the second position model ML2 according to three-dimensional connection points, the processor 111 is further configured to obtain substantially the same multiple three-dimensional structure nodes of first similar image sub-models M1A, M1B and second similar image sub-models M2A, M2B. the determination method of "substantially the same multiple three-dimensional structure nodes" as described above, It can choose three-dimensional structure nodes with higher spatial similarities between each other. For example, the three-dimensional structure nodes 81-83 and 84-86 shown in FIGS. 9A and 9B.

As mentioned above, the processor 111 modifies a spatial configuration of the first position model ML1 and the second position model ML2 (e.g., modify the coordinate direction, or change the proportion of spatial structure) according to the obtained same three-dimensional structure nodes 81~83 and 84~86, so that the first position model ML1 and the second position model ML2 correspond to each other according to the same multiple three-dimensional structure nodes. As shown in FIG. 9C, if the three-dimensional structure nodes 81 are substantially the same as the three-dimensional structure nodes 84, the processor 111 can calculate the connection method (e.g., rotate the first position model ML1 by an adjustment angle R) through an algorithm (e.g., the Iterative Closest Point algorithm), so that the corresponding three-dimensional structure nodes 81, 84 can be coincide. Accordingly, the first position model ML1 and the second position model ML2 can be accurately combined to the scene model Mout.

Alternatively stated, when combining according to three-dimensional connection points between the first position model ML1 and the second position model ML2, there may be distance, direction error between the first position model ML1 and the second position model ML2 due to different coordinate parameters. Accordingly, by further comparing similar image sub-models, and modifying according to the substantially same three-dimensional structure nodes between similar image sub-models, the error will be corrected to correctly generate the scene model Mout.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A scene model constructing method, comprising:
classifying, by a processor, a plurality of scene materials into a plurality of position groups according to a plurality of position parameters in the plurality of scene materials, wherein the scene materials comprised in a first position group of the plurality of position groups as a plurality of first group data, and the scene materials comprised in a second position group of the plurality of position groups as a plurality of second group data;
classifying, by the processor, the plurality of first group data into a plurality of first similar image sub-groups as a plurality of first sub-group data according to scene similarities between the plurality of first group data;
classifying, by the processor, the plurality of second group data into a plurality of second similar image sub-groups as a plurality of second sub-group data according to scene similarities between the plurality of second group data;
establishing, by the processor, a plurality of first similar image sub-models according to the plurality of first similar image sub-groups, and establishing, by the processor, a plurality of second similar image sub-models according to the plurality of second similar image sub-groups;
combining, by the processor, the plurality of first similar image sub-models to a first position model, and combining, by the processor, the plurality of second similar image sub-models to a second position model; and
combining, by the processor, the first position model and the second position model to a scene model.

2. The scene model constructing method of claim 1, further comprising:
comparing, by the processor, two adjacent frame data in a plurality of frame data to generate a plurality of change values; and
selecting, by the processor, at least one of the plurality of frame data, whose change value is greater than a threshold value, as the scene materials.

3. The scene model constructing method of claim 1, further comprising:
obtaining, by the processor, a plurality of feature points in each first group data of the plurality of first group data, wherein the plurality of feature points corresponds to a plurality of feature vectors; and
comparing, by the processor, the plurality of feature vectors corresponding to the plurality of first group data to obtain the scene similarities between the plurality of first group data.

4. The scene model constructing method of claim 1, further comprising:
comparing, by the processor, the plurality of first group data to obtain a plurality of feature similarities between the plurality of first group data;
setting, by the processor, the plurality of first group data, whose feature similarities is greater than a default value, as a plurality of two-dimensional feature points corresponding to the plurality of first similar image sub-models; and
combining, by the processor, the plurality of first similar image sub-models to the first position model according to the plurality of two-dimensional feature points.

5. The scene model constructing method of claim 1, further comprising:
arranging, by the processor, the plurality of first group data according to the scene similarities between the plurality of first group data to establish a plurality of vocabulary trees, wherein the plurality of vocabulary trees is configured to index the plurality of first sub-group data of the plurality of first similar image sub-groups.

6. The scene model constructing method of claim 5, wherein the plurality of vocabulary trees comprises a plurality of two-dimensional structure nodes, the plurality of two-dimensional structure nodes corresponds to the plurality of first sub-group data, and combining the plurality of first similar image sub-models to the first position model comprises:
  comparing, by the processor, the plurality of two-dimensional structure nodes on different of the plurality of vocabulary trees to obtain a plurality of feature similarities between the plurality of two-dimensional structure nodes;
  setting, by the processor, the plurality of two-dimensional structure nodes, whose feature similarities is greater than a default value, as a plurality of two-dimensional connected components configured to different of the plurality of first similar image sub-models; and
  combining, by the processor, the plurality of first similar image sub-models to the first position model according to the plurality of two-dimensional connected components.

7. The scene model constructing method of claim 5, wherein the plurality of vocabulary trees comprises a plurality of two-dimensional structure nodes, the plurality of two-dimensional structure nodes corresponds to the plurality of first sub-group data, and the scene model constructing method further comprises:
  comparing, by the processor, the plurality of two-dimensional structure nodes at a last leaf node level on different of the plurality of vocabulary trees to obtain a plurality of feature similarities between the plurality of two-dimensional structure nodes;
  setting, by the processor, the plurality of two-dimensional structure nodes, whose feature similarities is greater than a default value, as a plurality of two-dimensional connected components configured to different of the plurality of first similar image sub-models; and
  combining, by the processor, the plurality of first similar image sub-models to the first position model according to the plurality of two-dimensional connected components.

8. The scene model constructing method of claim 1, further comprising:
  obtaining, by the processor, a plurality of first three-dimensional structure nodes in the first position model and obtaining a plurality of second three-dimensional structure nodes in the second position model;
  comparing, by the processor, the plurality of first three-dimensional structure nodes and the plurality of second three-dimensional structure nodes to obtain a plurality of spatial similarities between the plurality of first three-dimensional structure nodes and the plurality of second three-dimensional structure nodes;
  setting, by the processor, the plurality of first three-dimensional structure nodes and the plurality of second three-dimensional structure nodes, whose spatial similarities is greater than a default value, as a plurality of three-dimensional connection points; and
  combining the first position model and the second position model to the scene model according to the plurality of three-dimensional connection points.

9. The scene model constructing method of claim 8, wherein the plurality of first three-dimensional structure nodes are arranged at an edge level of the first position model, and the plurality of second three-dimensional structure nodes are arranged at an edge level of the second position model.

10. The scene model constructing method of claim 1, further comprising:
  obtaining, by the processor, substantially same plurality of three-dimensional structure nodes of the plurality of first similar image sub-models and the plurality of second similar image sub-models after combining the plurality of first similar image sub-models to a first position model, and combining, by the processor, the plurality of second similar image sub-models to a second position model; and
  modifying, by the processor, a spatial configuration of the first position model and the second position model, so that the first position model and the second position model correspond to each other according to the same plurality of three-dimensional structure nodes.

11. A scene model construction system, comprising:
  a plurality of terminal devices configured to transmit a plurality of frame data; and
  a processor configured to receive the plurality of frame data to obtain a plurality of scene materials, wherein the processor is configured to classify the plurality of scene materials into a plurality of position groups according to a plurality of position parameters in the plurality of scene materials, then classify the plurality of position groups into a plurality of similar image sub-groups according to scene similarities between the plurality of scene materials; the processor is configured to establish a plurality of similar image sub-models according to the plurality of similar image sub-groups, then combine the plurality of similar image sub-models to a plurality of position models, and combine the plurality of position models to a scene model.

12. The scene model construction system of claim 11, wherein the processor is further configured to compare two adjacent frame data in a plurality of frame data to generate a plurality of change values, and generate the plurality of scene materials according to the plurality of change values.

13. The scene model construction system of claim 11, wherein the scene materials comprised in a first position group of the plurality of position groups as a plurality of first group data, and the scene materials comprised in a second position group of the plurality of position groups as a plurality of second group data; the plurality of similar image sub-models comprises a plurality of first similar image sub-groups and a plurality of second similar image sub-groups, the plurality of first similar image sub-groups are configured to establish a plurality of first similar image sub-models, and the plurality of second similar image sub-groups are configured to establish a plurality of second similar image sub-models; the plurality of position models comprises a first position model and a second position model; the processor is configured to classify the plurality of first group data into the plurality of first similar image sub-groups as a plurality of first sub-group data according to scene similarities between the plurality of first group data; the processor is further configured to classify the plurality of second group data into the plurality of second similar image sub-groups as a plurality of second sub-group data according to scene similarities between the plurality of second group data.

14. The scene model construction system of claim 13, wherein the processor is further configured to obtain a plurality of feature vectors and a plurality of feature points corresponding to the plurality of feature vectors from the plurality of first group data, and compare the plurality of feature vectors to obtain the scene similarities between the plurality of first group data.

15. The scene model construction system of claim 13, wherein the processor is further configured to compare the plurality of first group data to obtain a plurality of feature similarities between the plurality of first group data; the processor is further configured to set the plurality of first group data, whose feature similarities is greater than a default value, as a plurality of two-dimensional connected components configured to combine the plurality of first similar image sub-models, so that the processor combine the plurality of first similar image sub-models to the first position model according to the plurality of two-dimensional connected components.

16. The scene model construction system of claim 13, wherein the processor is further configured to establish a plurality of vocabulary trees by arranging the plurality of first group data according to the scene similarities, wherein the plurality of vocabulary trees are configured to index the plurality of first sub-group data of the plurality of similar image sub-groups.

17. The scene model construction system of claim 16, wherein the plurality of vocabulary trees comprises a plurality of two-dimensional structure nodes, the plurality of two-dimensional structure nodes correspond to the plurality of first sub-group data, the processor is further configured to compare the plurality of two-dimensional structure nodes on different of the plurality of vocabulary trees to obtain a plurality of feature similarities between the plurality of two-dimensional structure nodes; the processor is further configured to set the plurality of two-dimensional structure nodes, whose feature similarities is greater than a default value, as a plurality of two-dimensional connected components configured to different of the plurality of first similar image sub-models, so that the processor combine the plurality of first similar image sub-models to the first position model according to the plurality of two-dimensional connected components.

18. The scene model construction system of claim 16, wherein the plurality of vocabulary trees comprises a plurality of two-dimensional structure nodes, the plurality of two-dimensional structure nodes correspond to the plurality of first sub-group data, the processor is further configured to compare the plurality of two-dimensional structure nodes at a last leaf node level on different of the plurality of vocabulary trees to obtain a plurality of feature similarities between the plurality of two-dimensional structure nodes; the processor is further configured to set the plurality of two-dimensional structure nodes, whose feature similarities is greater than a default value, as a plurality of two-dimensional connected components configured to different of the plurality of first similar image sub-models, so that the processor combine the plurality of first similar image sub-models to the first position model according to the plurality of two-dimensional connected components.

19. The scene model construction system of claim 13, wherein the processor is further configured to obtain a plurality of first three-dimensional structure nodes in the first position model and a plurality of second three-dimensional structure nodes in the second position model, then compare the plurality of first three-dimensional structure nodes and the plurality of second three-dimensional structure nodes to obtain a plurality of spatial similarities between the plurality of first three-dimensional structure nodes and the plurality of second three-dimensional structure nodes, so that the processor sets the plurality of first three-dimensional structure nodes and the plurality of second three-dimensional structure nodes, whose spatial similarities is greater than a default value, as a plurality of three-dimensional connection points, and combines the first position model and the second position model to the scene model according to the plurality of three-dimensional connection points; the plurality of first three-dimensional structure nodes are arranged at an edge level of the first position model, and the plurality of second three-dimensional structure nodes are arranged at an edge level of the second position model.

20. The scene model construction system of claim 13, wherein the processor is further configured to obtain substantially the same plurality of three-dimensional structure nodes of the plurality of first similar image sub-models and the plurality of second similar image sub-models, then modify a spatial configuration of the first position model and the second position model, so that the first position model and the second position model correspond to each other according to the same plurality of three-dimensional structure nodes.

* * * * *